United States Patent
Eguchi et al.

(10) Patent No.: US 7,375,054 B2
(45) Date of Patent: May 20, 2008

(54) EXHAUST GAS TREATMENT CATALYST AND EXHAUST GAS TREATMENT METHOD

(75) Inventors: Asako Eguchi, Kanagawa-Ken (JP); Shuji Fujii, Kanagawa-Ken (JP); Akihiro Sawata, Kanagawa-Ken (JP); Yasuhiko Tsuru, Kanagawa-Ken (JP)

(73) Assignee: Mitsubishi Heavy Industries, Ltd., Yokohama (JP)

( * ) Notice: Subject to any disclaimer, the term of this patent is extended or adjusted under 35 U.S.C. 154(b) by 701 days.

(21) Appl. No.: 10/911,648

(22) Filed: Aug. 5, 2004

(65) Prior Publication Data

US 2005/0049143 A1 Mar. 3, 2005

(30) Foreign Application Priority Data

Aug. 28, 2003 (JP) .............................. 2003-303779

(51) Int. Cl.
- *B01J 23/00* (2006.01)
- *B01J 23/10* (2006.01)
- *B01J 23/40* (2006.01)
- *B01J 23/42* (2006.01)
- *B01J 23/58* (2006.01)
- *F01N 3/00* (2006.01)

(52) U.S. Cl. .................. 502/330; 502/302; 502/326; 502/328; 423/210; 60/399

(58) Field of Classification Search ................ 502/300

See application file for complete search history.

(56) References Cited

U.S. PATENT DOCUMENTS

| 4,626,521 A |   | 12/1986 | Murib |
| 5,418,389 A | * | 5/1995 | Watanabe .................. 257/295 |
| 5,700,747 A | * | 12/1997 | Kyogoku et al. ............ 502/66 |
| 6,069,288 A | * | 5/2000 | Ou et al. ..................... 585/800 |
| 6,569,803 B2 | * | 5/2003 | Takeuchi .................... 502/328 |
| 6,761,838 B2 | * | 7/2004 | Zeng et al. ................. 252/373 |
| 2002/0094932 A1 | * | 7/2002 | Faber et al. ................. 502/74 |

FOREIGN PATENT DOCUMENTS

| CN | 1391983 | * | 1/2003 |
| DE | 2 245 607 A |   | 3/1974 |
| EP | 0 941 757 A2 |   | 9/1999 |
| JP | 02099142 A | * | 4/1990 |
| JP | 3-47539 |   | 2/1991 |
| JP | 5-168860 |   | 7/1993 |
| JP | 5-184928 |   | 7/1993 |
| JP | 05168860 A | * | 7/1993 |
| JP | 2000342970 A | * | 12/2000 |
| JP | 2001-327839 |   | 11/2001 |
| JP | 2003170051 A | * | 6/2003 |
| JP | 2003267796 A | * | 9/2003 |
| WO | WO 03/024571 A1 |   | 3/2003 |

OTHER PUBLICATIONS

A. Garg, S. Chand, Vehicular pollution control—removal of carbon monoxide through catalytic converters, Indian Journal of Chemical Technology 8:33 (2001), pp. 219-222.*
T. Miyazaki, N. Tokubuchi, M. Arita, M. Inoue and I. Mochida, Catalytic combustion of carbon by alkali metal carbonates supported on perovskite-type oxide, Energy Fuels 11 (1997), pp. 832-836.*
Germany Office Action for Application No. 10 200 4 040 032.6-41 mailed on Jan. 5, 2007.

* cited by examiner

*Primary Examiner*—Vickie Kim
*Assistant Examiner*—Jennifer A Smith
(74) *Attorney, Agent, or Firm*—Westerman, Hattori, Daniels & Adrian, LLP.

(57) ABSTRACT

The present invention provides an exhaust gas treatment catalyst characterized by containing a compound oxide expressed by the following general formula (1), $$AM_xO_y \qquad (1)$$

(wherein A represents an alkali metal or alkaline earth metal, M represents Cr, Mn, Fe, Co or Ni, O represents oxygen, and $0 < x \leq 4$ and $0 < y \leq 8$)
and an exhaust gas treatment method using the said catalyst. According to the present invention, there can be provided an exhaust gas treatment compound oxide that can effectively remove particulates and NOx contained in exhaust gas with a high oxygen concentration that is discharged from a diesel engine etc., and also has excellent resistance to sulfur poisoning.

9 Claims, 10 Drawing Sheets

(b) PEROVSKITE TYPE (a) SPINEL TYPE

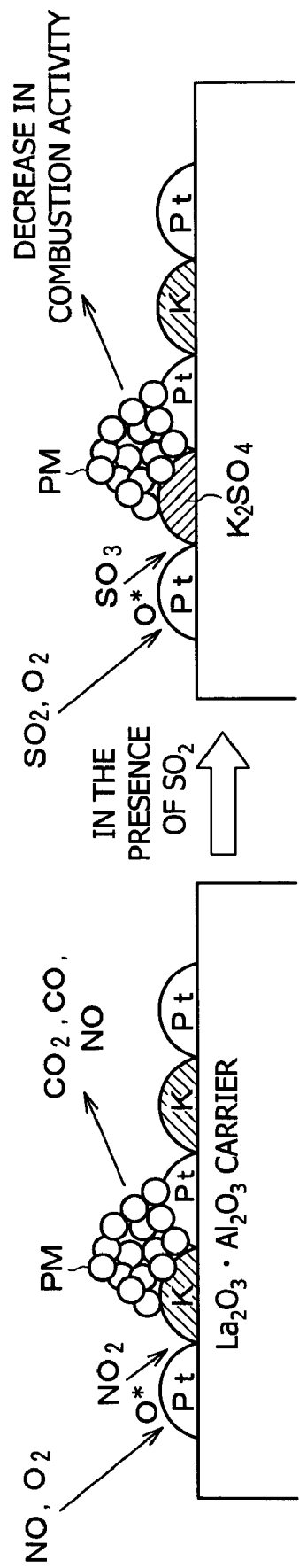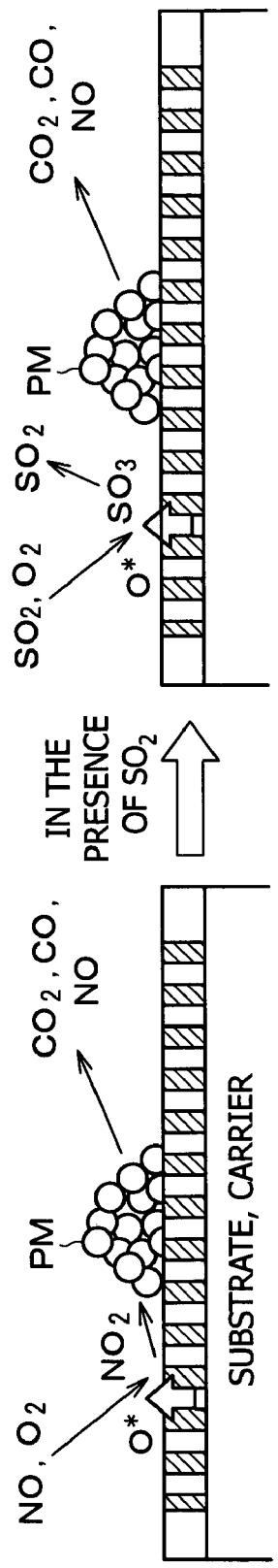

EXHAUST GAS TREATMENT CATALYST AND EXHAUST GAS TREATMENT METHOD

TECHNICAL FIELD

The present invention relates to an exhaust gas treatment catalyst and an exhaust gas treatment method using said exhaust gas treatment catalyst. More particularly, it relates to an exhaust gas treatment catalyst capable of simultaneously removing particulate carbon substances (hereinafter referred to as particulates) and nitrogen oxides (hereinafter referred to as NOx) contained in exhaust gas from a diesel engine or the like.

BACKGROUND ART

In recent years, particulate carbon substances, NOx, etc. in exhaust gas discharged from diesel engines or the like have gained notoriety as being harmful to environmental protection and health, and have thus been regulated. In order to remove the particulates to purify the exhaust gas, broadly-divided two methods as described below have been studied.

One is a method in which the particulates are captured by filtering exhaust gas using a metallic or ceramic filter having heat resistance and a three-dimensional porous construction, and if pressure loss is increased by this capture, the captured particulates are burned at a temperature of about 500 to 600° C. by using a burner, an electric heater, or the like to regenerate the filter.

The other is a method in which the particulates are self-burned by the action of a catalyst carried on a filter simultaneously with the particulate filtering operation.

In the case of the former method, pressure loss increases as the particulate removing effect is enhanced, so that the frequency of filter regeneration increases, which is thought to be economically disadvantageous. On the other hand, in the latter method, if there exists a catalyst that can keep its catalytic activity under the discharge conditions (gas composition and temperatures of exhaust gas from a diesel engine, power consumption can be reduced by lowering the heating temperature during filter regeneration. In addition, filter breakage caused by a high temperature can be prevented, so that this is thought to be an excellent method.

However, diesel engines use a heavy oil or light oil fuel usually containing sulfur, so that the exhaust gas contains much $SO_2$. Also, depending on the diesel engine operating conditions, the oxygen concentration in the exhaust gas varies over a wide range of 5 to 15%. Under such exhaust gas conditions, an exhaust gas treatment filter regenerating method has not yet been established in which accumulated particulates are ignited and burned properly without the occurrence of secondary pollution.

On the other hand, as a method for removing NOx, there has been proposed a method in which hydrocarbon is introduced into the exhaust gas, and NOx in the exhaust gas is removed by reduction by using this hydrocarbon (for example, refer to Japanese Patent Publication No. 44-13002 (No. 13002/1969)).

Also, as a method in which no hydrocarbon is introduced into the exhaust gas, a method has been tried in which NOx is removed by reduction employing a particular catalyst using particulates and remaining hydrocarbon that are present in the exhaust gas as a reducing agent. Various studies have been carried out regarding catalysts for removing NOx. For example, Japanese Patent Provisional Publication No. 3-47539 (No. 47539/1991) discloses an exhaust gas treatment material formed by carrying a catalyst consisting of (a) an alkaline element, (b) a particular transition metal element, and (c) a rare earth element on a heat-resistant porous filter. This exhaust gas treatment material can efficiently burn and remove particulates contained in the exhaust gas, and can remove NOx and other harmful components. However, when the exhaust gas has a high temperature above 900° C., the catalyst has poor long-term heat resistance. Also, in exhaust gas treatment methods using other catalysts, it is difficult for NOx in exhaust gas that has a high oxygen concentration to be removed efficiently without introducing hydrocarbon. Thus, a method for effectively removing harmful components including NOx has not yet been established.

On the other hand, as an exhaust gas purifying catalyst for a moving or stationary engine, there has conventionally been known an exhaust gas purifying three-way catalyst which purifies exhaust gas by simultaneously effecting the oxidation of carbon monoxide (CO) and hydrocarbon (HC) and the reduction of nitrogen oxides (NOx) in the exhaust gas. As such a catalyst, a catalyst is generally used which is formed by applying silica or alumina slurry onto a fire-resistant carrier, for example cordierite, firing it, and carrying a noble metal such as Pd, Pt or Rh thereon. The performance of the exhaust gas purifying catalyst using such a noble metal is greatly influenced by the kind of engine and the preset air-fuel ratio. For a lean air-fuel mixture, that is, the lean side in which the air-fuel ratio is high, the quantity of oxygen in the exhaust gas after combustion is large, wherein the oxidizing action is active and reducing action inactive. Conversely, on the rich side in which the air-fuel ratio is low, the quantity of oxygen in the exhaust gas after combustion is small, wherein the oxidizing action is inactive and reducing action active. On the rich side, the removal of NOx using a catalyst is relatively easy, but on the lean side, the removal of NOx is difficult because of the inactive oxidizing action.

For a gasoline engine, at the time of ordinary running, operation is performed on the lean side during which combustion occurs with an air-fuel mixture of excess oxygen, wherever practicable due to the demand for lower fuel consumption. This means that a catalyst capable of removing NOx sufficiently even on the lean side is desired.

Also, exhaust gas discharged from a diesel engine is always under conditions on the lean side, so that it is difficult for NOx to be removed. Therefore, as in the case with a gasoline engine, a catalyst capable of removing NOx is desired. As an exhaust gas purifying catalyst in such an atmosphere with excess oxygen, there have been proposed various types of catalysts that simultaneously effect the oxidation of carbon monoxide (CO) and hydrocarbon (HC) and the reduction of nitrogen oxides (NOx). As one of these catalysts, for example, a $Pt/Al_2O_3$ catalyst in which platinum is carried on alumina has been proposed. However, even if the quantity of carried platinum is increased in the atmosphere with excess oxygen, it cannot be said that this catalyst has a practically sufficient NOx removal efficiency.

As a solution to this problem, there has been proposed an NOx removing method using a catalyst that utilizes frequent lean/rich changes in the range from the vicinity of stoichiometric air-fuel ratio to an over-lean air-fuel ratio as in the case of gasoline engine, or utilizes lean/rich changes obtained by the use of a method in which, for example, fuel is injected into exhaust gas, which method can be applied to all types of engines (Japanese Patent Provisional Publication No. 5-168860 (No. 168860/1993)). However, this NOx removing method has problems of high cost due to the use of noble metal and deteriorated performance due to sulfur (SOx) poisoning.

In Japanese Patent Provisional Publication No. 5-184928 (No. 184928/1993), a compound oxide catalyst having a perovskite structure represented by a general formula of $Ln_{1-x}R_xMO_{3+a}$ ($0<x<1$ and $-1<a<0.2$), which does not use a noble metal as a catalyst composition, has been proposed as an exhaust gas treatment material for effectively removing particulates and NOx in exhaust gas. Also, a method has been proposed which uses a catalyst formed by applying a perovskite compound oxide and by impregnating the applied compound oxide with a noble metal (Japanese Patent Provisional Publication No. 2001-269578). However, it cannot be said that either of these methods has sufficient NOx removal performance. Also, at present, like the $Pt/Al_2O_3$ catalyst, the performance is decreased by SOx, and a catalyst having excellent sulfur resistance has not been studied.

DISCLOSURE OF THE INVENTION

To solve the above-described problems, the inventors conducted studies earnestly to develop an exhaust gas treatment catalyst that can effectively remove particulates and nitrogen oxides contained in exhaust gas with a high oxygen concentration that is discharged from a diesel engine etc., and also is excellent in resistance to sulfur poisoning as necessary. Also, the inventors studied an exhaust gas treatment catalyst that is low in cost because it does not contain a noble metal as a principal component, and can efficiently remove carbon monoxide and hydrocarbon in addition to nitrogen oxides in engine exhaust gas with excess oxygen and an exhaust gas treatment method using the said catalyst. As a result, the inventors found that the above-described problems can be solved at once by using a catalyst system containing a particular compound oxide expressed by a general formula of AMxOy. The present invention has been completed from this point of view.

Specifically, the present invention provides an exhaust gas treatment catalyst which contains a compound oxide expressed by the following general formula (1),

AMxOy        (1)

(wherein A represents an alkali metal or alkaline earth metal, M represents Cr, Mn, Fe, Co or Ni, O represents oxygen, and $0<x\leq4$ and $0<y\leq8$, where A represents one atom). For the exhaust gas treatment catalyst in accordance with the present invention, there can also be used a catalyst in which a transition metal such as Mn in addition to A and M in the formula, a rare earth element such as La, Ce, Pr, Nd, and Sm, or a noble metal such as Au, Ag, Pt, Pd, Ir, Rh and Ru is contained in the compound oxide expressed by general formula (1). In the compound oxide used in the present invention, the composition ratio of AMxOy is usually $0<x\leq4$ and $0<y\leq8$, preferably $0<x\leq3$ and $0<y\leq6$, and further preferably $0<x\leq2$ and $0<y\leq4$. In general formula (1), it is especially preferable that M be Co or Fe. A is selected arbitrarily from alkali metals such as Li, Na, K, Rb and Cs or alkaline earth metals such as Mg, Ca, Sr and Ba. However, A is preferably at least one kind selected from a group consisting of Li, Na, K, Rb and Ba, and especially preferably selected from a group consisting of alkali metals of Na, K, Rb and Cs. Among these metals, K is preferable. A method for preparing such a compound oxide is not subject to any special restriction. The compound oxide is obtained by a solid phase method in which $K_2O$ and a Co oxide are mixed and ground, subsequently being fired preferably at 650 to 1150° C., or by a liquid phase method in which solutions of various kinds of salts of K and Co are mixed in a proper amount and then dried, subsequently being fired preferably at 650 to 1150° C.

Also, the exhaust gas treatment catalyst in accordance with the present invention can contain a perovskite compound oxide expressed by the following general formula (2) in addition to the compound oxide of general formula (1),

$Ln_{1-\alpha}A_\alpha MO_3$        (2)

(wheren, Ln represents a lanthanoid group element, A represents an alkali metal, M represents Cr, Mn, Fe, Co or Ni, O represents oxygen, and $0<\alpha\leq0.5$). In this perovskite compound oxide, the composition ratio of $Ln_{1-\alpha}A_\alpha MO_3$ is usually $0<\alpha\leq0.5$, preferably $0<\alpha\leq0.3$. In general formula (2), it is preferable that Ln be La, Ce or Nd. Among these, La is preferable.

Further, in the present invention, a carbonate of an alkali metal or alkaline earth metal can further be contained in addition to the compound oxide. Specifically, at least one kind of carbonate selected from a group consisting of $Li_2CO_3$, $Na_2CO_3$, $K_2CO_3$, $Cs_2CO_3$, $Rb_2CO_3$ and $Ba_2CO_3$ is preferably contained.

Also, a noble metal may be contained in some of the compound oxide of general formula (1). In this case, the noble metal is preferably at least one kind selected from a group consisting of Au, Ag, Pt, Pd, Ir, Rh and Ru.

The catalyst in accordance with the present invention containing the above-described compound oxide is a compact molded into a plate shape or powder shape, or is used by being directly carried on a structure, or by being carried on a carrier. As the structure capable of being used in the present invention, a honeycomb consisting of cordierite, SiC, a heat-resistant metal alloy, etc. can be cited. Also, as the carrier, alumina, zirconia, silica alumina, silica, zeolite, etc. can be cited. The kind and physical properties of these porous carriers are not subject to any special restriction, and any porous carrier that has been used conventionally for catalyst can be used. Also, the porous carrier that carries a catalyst may be used by being carried on the structure. The amount of carried catalyst is not subject to any special restriction, but an amount of carried catalyst of 30 to 300 g/m² per unit area is preferable to achieve substantially effective NOx removal efficiency.

In purifying exhaust gas in the exhaust gas purifying method in accordance with the present invention, a place where the catalyst is placed in the exhaust passage of engine is not subject to any special restriction. Specifically, for example, by carrying fine powder of the exhaust gas treatment catalyst on a filter-form carrier provided in the exhaust passage at the rear stage of the engine, particulates in exhaust gas can be removed by burning, and at the same time, nitrogen oxides can be removed.

Also, the space velocity (SV) at which exhaust gas is introduced to the catalyst layer is not subject to any special restriction, although for example, the range of 5000 to 100,000 hr⁻¹ is preferable. Also, the catalyst layer temperature is preferably 200 to 600° C. In particular, as a condition for achieving catalytic activity, the range of 300 to 500° C. is preferable. The lean/rich condition is also not subject to any special restriction. For example, a method in which a system for injecting fuel into an engine is controlled, a method in which fuel is added into high-temperature exhaust gas, and the like method can be used.

If the exhaust gas treatment catalyst in accordance with the present invention is used, particulates in exhaust gas having a high oxygen concentration can be removed by burning at a relatively low temperature, and at the same time, NOx can be removed effectively. Also, the compound oxide in the exhaust gas treatment catalyst in accordance with the present invention can have a high heat resistance and further resistance to sulfur poisoning, so that high exhaust gas treatment performance can be maintained for a long period of time. The exhaust gas treatment method using the catalyst in accordance with the present invention is especially suitable for exhaust gas treatment in an oxidizing atmosphere as found in diesel engine exhaust gas etc.

Also, if the catalyst containing the compound oxide in accordance with the present is used, and is provided in the exhaust passage of a lean-burning internal combustion engine, CO, HC and NOx can be removed with high efficiency at the time of lean/rich operation. Although the operation of catalyst in accordance with the present invention has not been clarified completely, it is assumed as described below. At the lean time of oxidizing atmosphere, some of NO reacts with CO and HC on the catalyst (Co atom). Although some releases as $N_2$, most reacts with oxygen and is oxidized into NOx (x=2, 3). For the catalyst in accordance with the present invention, this NOx transfers onto the carrier near the catalyst or to A atom on the catalyst and is held. At the rich time when the amount of reducing gas is large, the held NOx reacts with reducing molecules such as a HC decomposition product produced in large quantities by CO or M to yield $N_2$. At this time, the reducing gas is also removed at the same time. Thus, A atom on the carrier or catalyst can hold NOx again, so that NOx can be accumulated again at the lean time.

Hereunder, the present invention is explained in more detail with reference to an embodiment. The scope of the present invention is not limited by this embodiment.

BRIEF DESCRIPTION OF THE DRAWINGS

FIG. 3 is an image view schematically showing exhaust gas treatment on a catalyst in the presence of $SO_2$, FIG. 3(a) showing a case of a conventional catalyst, and FIG. 3(b) showing a case of a catalyst of the present invention;

Figure 1:
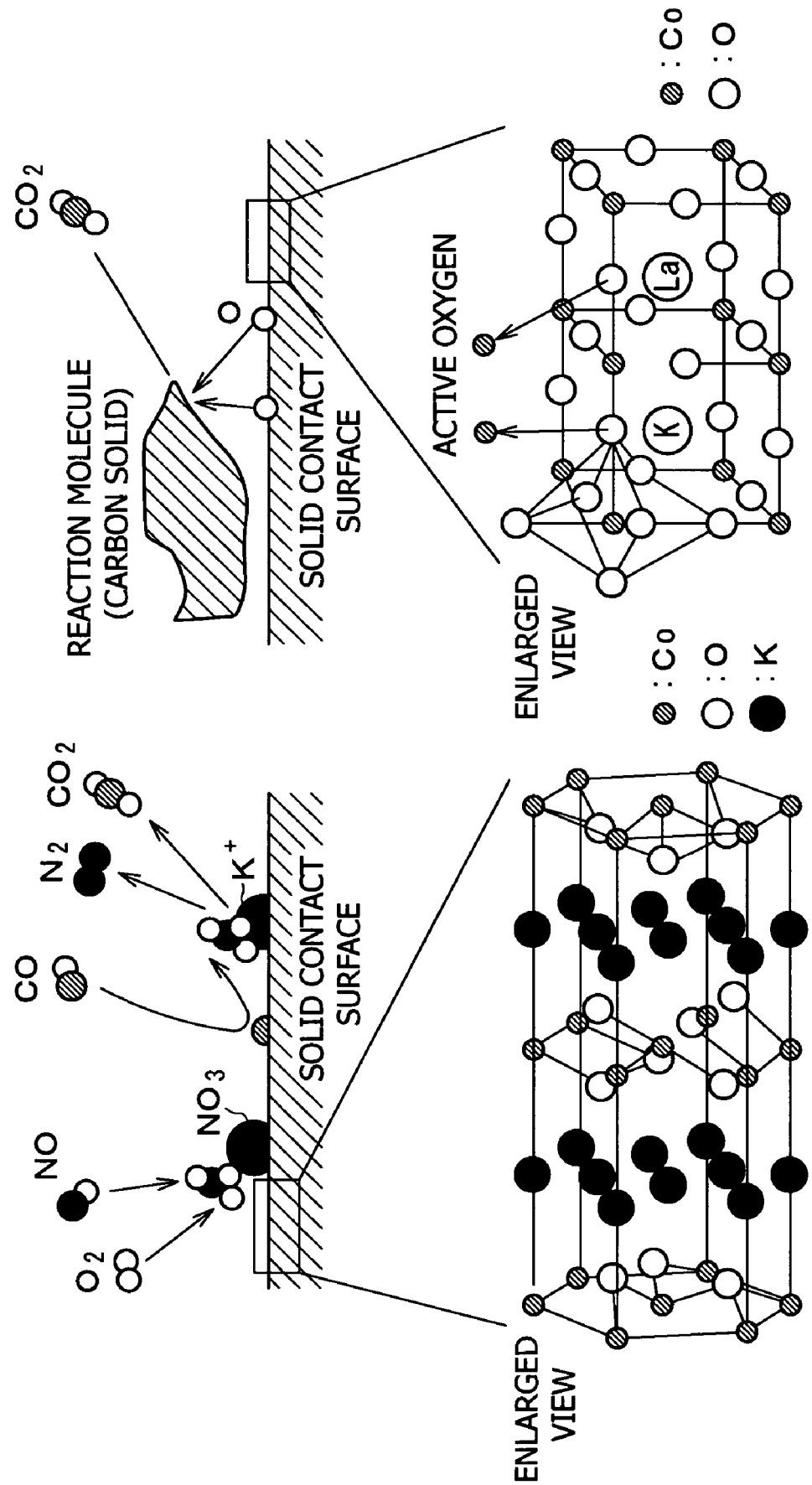
FIG. 1 is an image view schematically showing the structure and operation of a compound oxide catalyst, FIG. 1(a) showing a spinel structure (spinel type), and FIG. 1(b) showing a perovskite structure (perovskite type)

In the above figures, reference numeral 1 denotes a catalyst device, 2 denotes a porous ceramic, 3 denotes a flow path wall, 4 denotes a flow path closing portion, and 5 denotes a PM catalyst.

BEST MODE FOR CARRYING OUT THE INVENTION

A high wear resistant and high hardness film in accordance with an embodiment will now be explained with reference to the accompanying drawing.

An exhaust gas treatment catalyst in accordance with the present invention contains a compound oxide expressed by the following general formula (1).

$$AM_xO_y \qquad (1)$$

wherein A represents an alkali metal or an alkaline earth metal, M represents Cr, Mn, Fe, Co or Ni, O represents oxygen, and $0<x\leqq 4$ and $0<y\leqq 8$. A method for preparing this exhaust gas treatment catalyst is not subject to any special restriction. The exhaust gas treatment catalyst can be manufactured, for example, by the method described below.

A catalyst containing the compound oxide of the present invention can be prepared by mixing an oxide, hydroxide, carbonate, nitrate, sulfate, acetate, oxalate, chloride, etc. of each metallic element in a predetermined ratio, and finally by firing the mixture usually at 600 to 1000° C., preferably at 700 to 900° C., for about 2 to 10 hours. As a method for mixing the above-described substances, there can be used a method in which the substances are mixed in a solid state, a method in which aqueous solution of mixed salts of metal is evaporated to dryness, and a coprecipitation method in which aqueous solution of mixed salts of metal is hydrolyzed by an alkaline aqueous solution such as ammonia water, and the like method.

As a method for preparing the catalyst, specifically, a solid phase method by ball mill mixing, a coprecipitation method, a thermal decomposition method, and the like method can be used. For example, a carbonate of A, which is an alkali metal or an alkaline earth metal, and an oxide of transition metal M are mixed with each other after being weighed. When A is K, $K_2CO_3$ is used, all of the catalysts containing the compound oxide of general formula (1) obtained by firing have a lower PM combustion start temperature and higher NOx removal efficiency than the Pt/$Al_2O_3$ base catalyst. As the content of the compound oxide of general formula (1) in the catalyst increases (preferably not lower than 5 mol %), the NOx removal efficiency increases further though the PM combustion start temperature is unchanged. Also, the catalyst containing the compound oxide of general formula (1) has excellent resistance to sulfur poisoning, and also is less liable to yield sulfuric acid, which causes corrosion of piping etc., because it has low $SO_2$ oxidation performance as compared with the noble metal of Pt/$Al_2O_3$.

As a treatment condition for performance evaluation, for example, a lean steady condition can be cited. A carrier component such as activated carbon is mixed with the catalyst in the ratio of about 1 to 10% by weight, and exhaust gas from a diesel engine is caused to flow. The temperature of catalyst is raised, by which the combustion start temperature of particulate can be determined based on the yield of $CO_2$, and also the NOx removal efficiency can be determined from the NOx content in front and behind the catalyst.

In the compound oxide of general formula (1), the transition metal M is Cr, Mn, Fe, Co or Ni. Regarding the transition metal M, the compound oxide can be prepared arbitrarily by mixing a carbonate of alkali metal with an oxide of Cr, Mn, Fe, Co or Ni. When $K_2CO_3$ is used as a carbonate, as the obtained compound oxide, for example, $K_2CrO_4$, $K_2Mn_4O_8$, $KFeO_2$, $KCo_2O_4$, and $KNiO_2$ can be cited.

Also, in general formula (1), A is an alkali metal or an alkaline earth metal. Specifically, A is selected from alkali metals such as Li, Na, K, Rb and Cs or alkaline earth metals such as Mg, Ca, Sr and Ba. Regarding A in a compound oxide, the compound oxide can be prepared arbitrarily by mixing a carbonate thereof with an oxide of a transition metal M. When a Co oxide is used as a transition metal oxide, as the obtained compound oxide, for example, $LiCoO_2$, $NaCoO_2$, $KCo_2O_4$, $CsCoO_3$, $RbCoO_2$, and $Ba_2CoO_4$ can be cited. All of the compound oxides of general formula (1) have a lower PM combustion start temperature and higher NOx removal efficiency than the Pt/$Al_2O_3$ base catalyst. The PM combustion start temperature is not influenced greatly by the kind and amount of alkali metal or alkaline earth metal, but the NOx removal efficiency increases further as the content of the compound oxide of general formula (1) in the catalyst increases. The content of the compound oxide of general formula (1) is preferably not lower than 3 mol %, further preferably not lower than 6 mol %.

The structure of the compound oxide expressed by general formula (1) is not subject to any special restriction, but at least some thereof preferably has a mode having a spinel structure as shown in FIG. 1(a).

The catalyst of this embodiment may contain a metal oxide expressed by a general formula of MvOw (M is the same as that in formula (1), $0<v\leq3$, $0<w\leq4$) in addition to the compound oxide of general formula (1). In this case, usually, in a state in which the metal oxide coexists with the compound oxide, the transition metal that is not taken in the compound oxide of general formula (1) is contained in the catalyst in the form of oxide.

The catalyst in accordance with the present invention can further contain a perovskite compound oxide expressed by the following general formula (2) in addition to the compound oxide of general formula (1).

$$Ln_{1-\alpha}A_\alpha MO_3 \tag{2}$$

In general formula (2), Ln is a lanthanoid group element, preferably being La, Ce or Nd. A is an alkali metal such as Li, Na, K, Rb and Cs, and M is Cr, Mn, Fe, Co or Ni. α, which is a content ratio between Ln and A, is usually $0<\alpha\leq0.5$, preferably $0<\alpha\leq0.3$. For the perovskite compound oxide expressed by general formula (2), the composition ratio of oxygen somewhat varies depending on the kind of constituent metal and service conditions (temperature condition, etc.). Specifically, the perovskite compound oxide may turn to what is called an oxygen deficiency type oxide, in which the composition ratio of oxygen is slightly lower than 1, or may turn to an oxygen excess type oxide. The present invention includes such an oxygen deficiency type oxide and oxygen excess type oxide. The perovskite structure of the compound oxide expressed by general formula (2) is not subject to any special restriction, but usually the compound oxide has a perovskite structure as shown in FIG. 1(b).

As a method for preparing the catalyst, a method by ball mill mixing and the like method can be used as described above. When the perovskite compound oxide is present, however, for example, a hydroxide of lanthanoid group element Ln, a carbonate of alkali metal A, and an oxide of transition metal M are mixed. The charge composition of metallic elements in mixing is Ln:A:M=1−a:a:1 in mole ratio, in which a is in the range of $0<a\leq1$, preferably $0.4\leq a<1$, further preferably $0.5\leq a<1$, and especially preferably $0.6\leq a<1$. Therefore, the perovskite compound oxide of general formula (2) coexists with the compound oxide of general formula (1). Usually, as the value of α increases, the ratio of coexisting compound oxide of general formula (1) tends to increase.

All of the obtained compound oxides in the coexisting state have a lower PM combustion activity temperature and higher NOx removal efficiency than Pt/$Al_2O_3$. Therefore, even in the presence of perovskite compound oxide, particulates and NOx can be removed effectively in exhaust gas treatment. Also, the obtained compound oxide has excellent resistance to sulfur poisoning, and also is less liable to yield sulfuric acid, which causes corrosion of piping etc., because it has low $SO_2$ oxidation performance as compared with the noble metal of Pt/$Al_2O_3$.

The catalyst of this embodiment may contain a metal oxide expressed by a general formula of MvOw (M is the same as that in formula (1) or (2), $0<v\leq3$, $0<w\leq4$) in addition to the compound oxides of general formulas (1) and (2). In this case, usually, in a state in which the metal oxide coexists with the compound oxide, the transition metal that is not taken in the compound oxides of general formula (1) and (2) are contained in the catalyst in the form of an oxide.

As the exhaust gas treatment catalyst in accordance with the present invention, a mode which further contains a noble metal in addition to the above-described compound oxides can be cited. A carbonate of alkali metal A, an oxide of transition metal M, and an oxide of noble metal P are mixed, or some of transmission metal M is replaced with a noble metal so that the ratio of transition metal component M and noble metal component P is, for example, M:P =0.99-0.70: 0.01-0.30, preferably M:P=0.99-0.9:0.01-0.1, in mole ratio at the time of charging. As the noble metal component P, Au, Ag, Pt, Pd, Ir, Rh, Ru, etc., preferably Pt, Ir, Pd and Rh, can be cited.

When the perovskite compound oxide is present, for example, a hydroxide of lanthanoid group element Ln is further added, and mixing is performed in the same way as described above. The charge composition of metallic elements in mixing is Ln:A:M+P=1-a:a:1 in mole ratio, in which a is in the range of 0<a<1, preferably $0.4 \leq a<1$, and further preferably $0.6 \leq a<1$.

By adding a noble metal to the compound oxide, a further improvement in NOx removal efficiency is recognized, and in particular, Pt and Ir have high NOx removal efficiency.

For the exhaust gas treatment catalyst in accordance with the present invention, a mode which contains a carbonate of alkali metal or alkaline earth metal in addition to the compound oxide can be cited. When the carbonate is present, the charge composition of metallic elements in mixing, for example, a carbonate of alkali metal A with an oxide of transition metal M is A:M=0.1-3:1, preferably A:M=0.1-1:1, in mole ratio. Therefore, in the obtained catalyst, a carbonate of excess alkali metal A exists, so that the resistance to sulfur poisoning of catalyst further increases. As a carbonate added excessively, for example, $K_2CO_3$ can suitably be cited.

The above-described compound oxide contained in the catalyst in accordance with the present invention has high NOx removal efficiency because particulates burn at low temperatures even in an oxidizing atmosphere. Also, the compound oxide has excellent heat resistance, so that even if it is exposed to high-temperature exhaust gas of about 800 to 850° C. for a long period of time, the catalyst performance scarcely decreases.

Also, since in the compound oxide of general formula (1), other compound oxides and carbonates coexist, the catalyst in accordance with the present invention has excellent resistance to a poisoning substance such as $SO_2$, and even if the catalyst is used for a long period of time, the catalytic activity is not deteriorated.

For a mixture of simple oxide of the above-described metallic element (simple mixture of $La_2O_3$, $A_2O$ or AO (A is an alkali metal or an alkaline earth metal) or an oxide of M, not taking a form of compound oxide), the heat resistance and durability are not good, so that sufficient exhaust gas treatment cannot be accomplished.

Next, an exhaust gas treatment method using the catalyst in accordance with the present invention will be explained.

In the exhaust gas treatment method in accordance with the present invention, exhaust gas is treated by using the above-described exhaust gas treatment catalyst. By fine powder of the catalyst carried on a filter, particulates in exhaust gas can mainly be removed by burning, and at the same time, the particulates can be caused to act as a reducing agent to remove nitrogen oxides by reduction. The method for carrying the catalyst on the filter is not subject to any special restriction. For example, the catalyst can be carried by an impregnation method, a wash coat method, and the like method.

Figure 2:
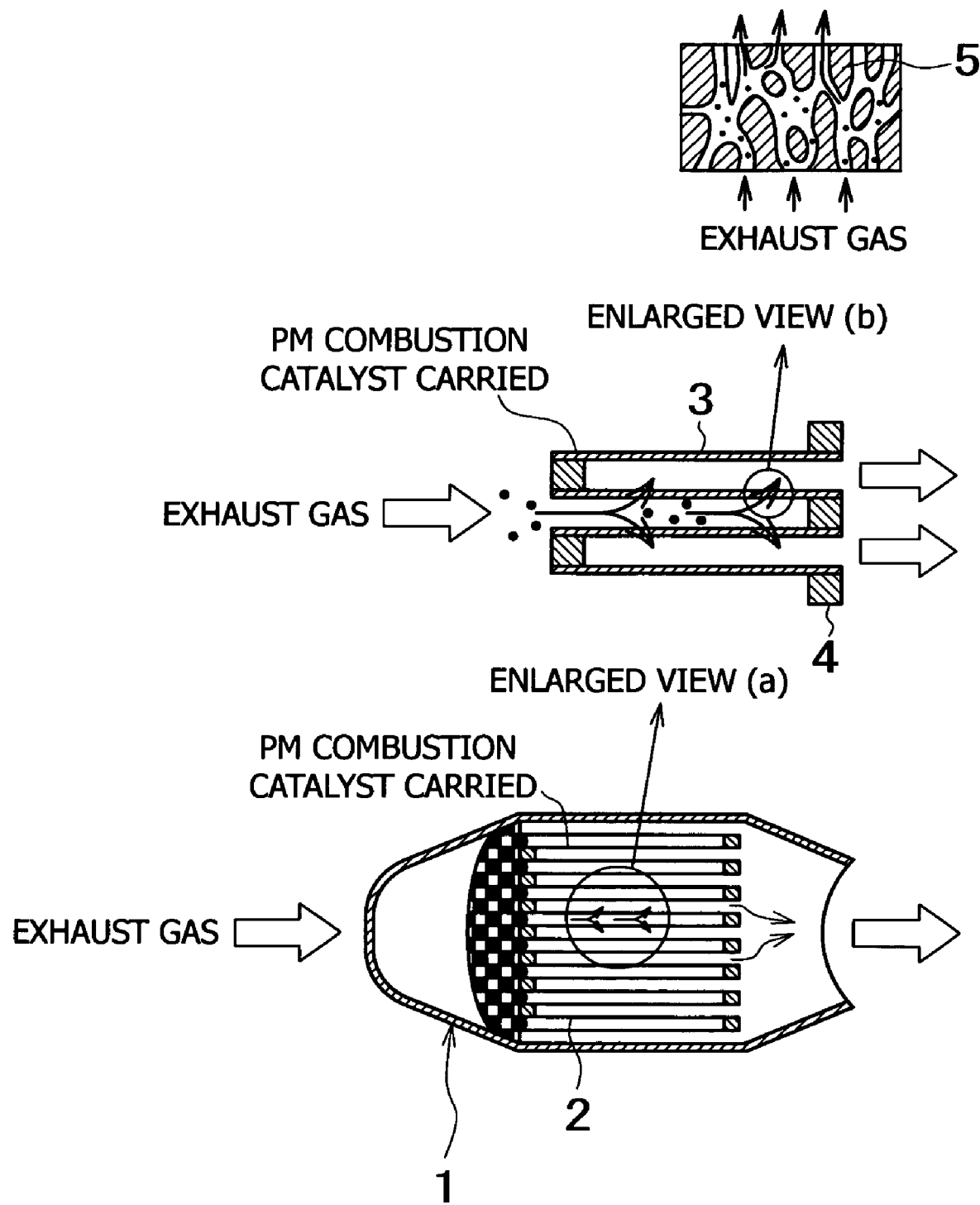
FIG. 2 is a schematic view showing one example of a catalyst device using an exhaust gas treatment catalyst.

FIG. 2 schematically shows one example of a catalyst device in which the catalyst in accordance with the present invention is suitably used.

Carbon components such as graphite fine particles in exhaust gas are trapped by the filter formed of a porous ceramic etc. The ordinary combustion of carbon by oxygen requires a temperature of about 600° C. However, on the filter carrying the PM burning catalyst in accordance with the present invention, the burning reaction is facilitated, so that combustion can be produced, for example, at a temperature in the range of 200 to 400° C. Therefore, even for relatively low-temperature exhaust gas, particulates can easily be removed by burning from the exhaust gas.

FIG. 3 is an image view of a schematic comparison of the exhaust gas treatment in the case where the catalyst in accordance with the present invention is used (FIG. 3(b)) versus the exhaust gas treatment in the case where a conventional catalyst is used (FIG. 3(a)). For the conventional catalyst, as shown in FIG. 3(a), an alkali metal K forms a sulfate and is stabilized, so that catalytic activity decreases remarkably. In contrast, for the catalyst in accordance with the present invention, as shown in FIG. 3(b), an alkali metal is stabilized in the crystal lattice on the surface, and active oxygen is generated to accelerate the oxidation of NO and PM. Therefore, sulfate is less liable to be formed, and the adsorbed $SO_2$ is easily released.

By using such an exhaust gas treatment catalyst in accordance with the present invention, particulates in exhaust gas can be ignited and burned at a relatively low temperature, and even in the presence of sulfur oxides, the deterioration in catalyst can be prevented effectively. Also, nitrogen oxides NOx can effectively be removed by reduction by causing the particulates to act as a reducing agent. The reason for this is that the particulates in exhaust gas coexist with the catalyst, oxygen, and NOx, by which the ignition temperature is lowered, and the particulates are burned (oxidized) at a temperature of about 400° C. or lower. It is thought that NO in exhaust gas is oxidized into $NO_2$ having high reactivity with the particulates, and the particulate oxidation and the NO reduction proceed substantially at the same time.

Hereunder, the present invention is explained more concretely by means of examples. The present invention is not limited by these examples.

EXAMPLE

Example 1

[Synthesis of Catalyst Containing Compound Oxide of General Formula (1)]

34 grams of $K_2CO_3$ and 16 grams of CoO were put in a dispersing agent and 50 grams of ethanol, and were ground and mixed in a ball mill for 20 hours. The obtained slurry was dried at 120° C. for 24 hours, and the produced powder was fired in the air at 850° C. for 10 hours to obtain catalyst A.

Example 2

[Synthesis of Catalyst Containing Compound Oxide of General Formula (1) and Perovskite Compound Oxide of General Formula (2)]

13.7 grams of $K_2CO_3$, 21.3 grams of CoO, and 16.2 grams of $La(OH)_3$ were put in a dispersing agent and 50 grams of ethanol, and were ground and mixed in a ball mill for 20 hours. The obtained slurry was dried at 120° C. for 24 hours, and the produced powder was fired in the air at 850° C. for 10 hours to obtain catalyst B containing compound oxides (1) and (2) containing Co.

By using the same method as described above except that an oxide of Mn or Fe was used in place of CoO, catalyst B1 containing compound oxides (1) and (2) containing Mn and catalyst B2 containing compound oxides (1) and (2) containing Fe were obtained.

Example 3

[Synthesis of Catalyst Containing Compound Oxide of General Formula (1) Containing Noble Metal and Perovskite Compound Oxide of General Formula (2)]

13.7 grams of $K_2CO_3$, 20.8 grams of CoO, 16.2 grams of $La(OH)_3$, and 0.5 grams of $PtO_2$ were put in a dispersing agent and 50 grams of ethanol, and were ground and mixed in a ball mill for 20 hours. The obtained slurry was dried at 120° C. for 24 hours, and the produced powder was fired in the air at 850° C. for 10 hours to obtain catalyst C.

Comparative Example 1

Aqueous solution of $H_2PtCl_4$ was put in $Al_2O_3$ slurry and agitated and dried, and subsequently was fired in the air at 550° C. for 10 hours to obtain $Pt/Al_2O_3$ catalyst D of 4% by weight.

Comparative Example 2

Commercially available $Co_3O_4$ was ground and fired in the air at 550° C. for 10 hours to obtain $Co_3O_4$ catalyst E. By using the same method as described above except that $Mn_2O_3$ or $Fe_2O_3$ was used in place of $Co_3O_4$, $Mn_2O_3$ catalyst E1 and $Fe_2O_3$ catalyst E2 were obtained.

Comparative Example 3

[Synthesis of $La_{0.7}K_{0.3}CoO_3$ Perovskite Compound Oxide]

4.8 grams of $K_2CO_3$, 17.4 grams of CoO, and 30.8 grams of $La(OH)_3$ were put in a dispersing agent and 50 grams of ethanol, and were ground and mixed in a ball mill for 20 hours. The obtained slurry was dried at 120° C. for 24 hours, and the produced powder was fired in the air at 850° C. for 10 hours to obtain catalyst F.

Comparative Example 4

Commercially available $K_2CO_3$ was ground and dried at 120° C. for 10 hours to obtain $K_2CO_3$ catalyst G.

A structural analysis using X rays was carried out on the obtained catalysts of examples and comparative examples. As a result, the following mole ratio of each component was obtained. The reason why the mole ratio before reaction start does not correspond to the mole ratio after reaction start is presumed to be due to the fact that ease of evaporation of each principal component during firing differs.

Catalyst A: $KCoO_2$-1%, $KCo_2O_4$-6%, $K_2Co_3O_6$-2%, $Co_3O_4$-86%, $K_2CO_3$-2%, the balance being incapable of being identified Catalyst B: perovskite $La_{0.72}K_{0.28}CoO_3$-65%, $KCo_2O_4$-12%, $Co_3O_4$-21%, $K_2CO_3$-2%

Catalyst C: perovskite $La_{0.7}K_{0.3}Co_{0.95}Pt_{0.05}O_3$-65%, $K(Co_{0.95}Pt_{0.05})xOy$-9%, $Co_3O_4$-24%, $K_2CO_3$-2%

Catalyst D: $Al_2O_3$-97%, Pt metal-3%

Catalyst E: $Co_3O_4$-100%

Catalyst F: perovskite $La_{0.7}K_{0.3}CoO_3$-94%, $Co_3O_4$-6%

Catalyst G: $K_2CO_3$-100%

A method for evaluating catalyst is as described below. The obtained catalyst was ground, and 0.3 gram of particles with a particle diameter of 0.3 to 0.5 mm was taken out and charged in the catalyst layer. After being held at a predetermined temperature, a rich/lean state was repeated alternately under the following gas flow conditions, and NO, CO and HC were measured before and after passage through catalyst.

At SV=30000 $h^{-1}$,

Rich condition (2 seconds): NO-400 ppm, CO-6%, $C_3H_6$-100 ppm, $H_2$-2%, $H_2O$-6%, the balance being $N_2$ Lean condition (90 seconds): NO-400 ppm, CO-1200 ppm, $C_3H_6$-100 ppm, $O_2$-5%, $H_2O$-6%

The removal efficiency of CO, HC and NOx under these conditions was investigated by measuring the gas concentration in front of and behind the catalyst by using an exhaust gas analyzer.

Figure 4:
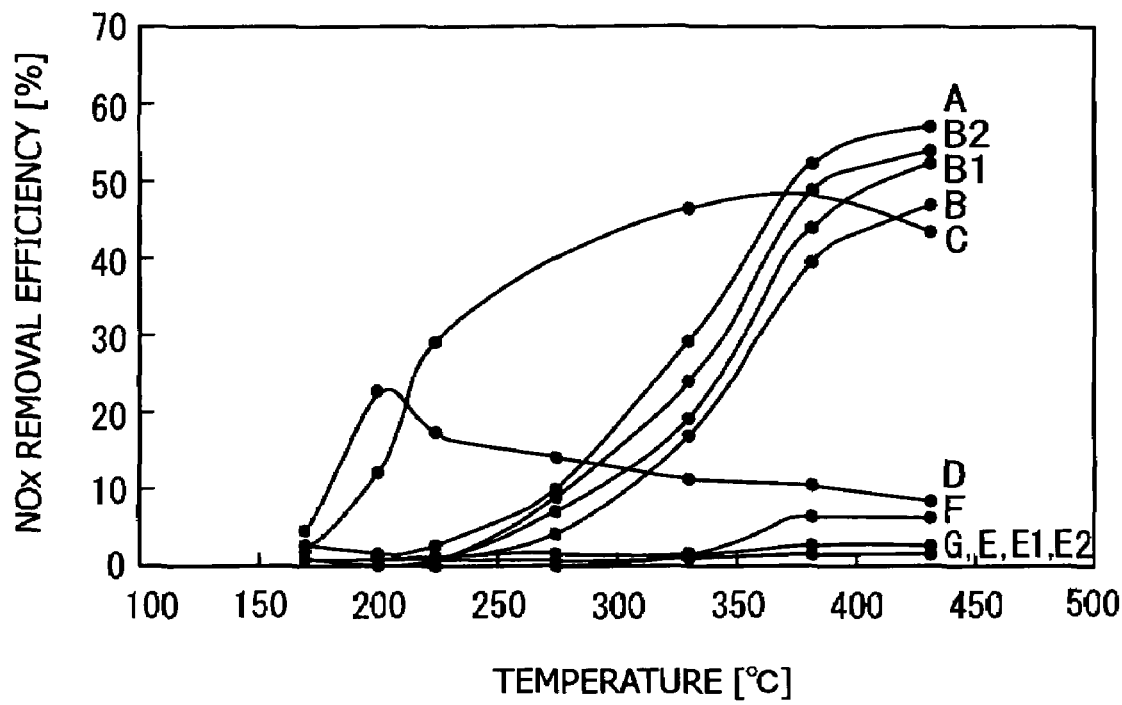
FIG. 4 is a graph showing data of NOx removal efficiency of a catalyst obtained in examples 1 to 3, which is measured by changing temperature.

The NOx emission at the inlet of catalyst and the NOx emission after passage through catalyst were measured by using the analyzer, and the decreased quantity of NOx was determined from the difference therebetween, by which NOx removal efficiency was obtained. FIG. 4 shows the NOx removal efficiency (unit: %) of each catalyst at a predetermined temperature at the time when 45 seconds had elapsed after the rich condition is changed to the lean condition.

Examples 1 to 3 (A, B, C) and Mn and Fe base catalysts (B1, B2) prepared in example 2 exhibit high NOx removal efficiency at temperatures of 275° C. and higher compared with $Pt/Al_2O_3$ (D) of comparative example 1. Also, it was found that example 1 (A) has higher NOx removal efficiency than comparative example 2 (E) and comparative example 3 (F).

It is apparent that because of the presence of $KCoO_2$, $KCo_2O_4$, and $K_2Co_3O_6$, example 1 (A) has higherer NOx removal efficiency than the NOx removal efficiency of $Co_3O_4$, $Mn_2O_3$, $Fe_2O_3$ (E, E1, E2) single (comparative example 2), the NOx removal efficiency when perovskite $La_{0.7}K_{0.3}CoO_3$-94% and $Co_3O_4$-6% (F) coexist (comparative example 3), and the NOx removal efficiency of $K_2CO_3$ single (comparative example 4) (G).

Example 2 (B) also has high NOx removal efficiency because it contains a $KCo_2O_4$ phase. Example 3 (C) has high NOx removal efficiency at temperatures of 250° C. and higher compared with the case of Pt single (comparative example 1)(D) because of the synergistic effect or composite effect.

In addition, Table 1 gives the HC removal efficiency (%) and CO removal efficiency (%) of each catalyst at the lean time.

TABLE 1

| Temperature (° C.) | Catalyst A | | Catalyst B | | Catalyst C | | Catalyst D | | Catalyst E | | Catalyst F | |
|---|---|---|---|---|---|---|---|---|---|---|---|---|
| | HC Removal efficiency | CO removal efficiency | HC removal efficiency | CO removal efficiency | HC removal efficiency | CO removal efficiency | HC removal efficiency | CO removal efficiency | HC removal efficiency | CO removal efficiency | HC removal efficiency | CO removal efficiency |
| 175 | 36 | 21 | 35 | 21 | 40 | 88 | 36 | 65 | 10 | 5 | 38 | 19 |
| 200 | 40 | 38 | 38 | 36 | 61 | 97 | 55 | 70 | 14 | 12 | 41 | 25 |
| 225 | 45 | 79 | 38 | 74 | 100 | 100 | 100 | 100 | 22 | 22 | 38 | 45 |
| 275 | 51 | 100 | 52 | 99 | 100 | 99 | 100 | 100 | 30 | 50 | 49 | 98 |
| 330 | 75 | 100 | 85 | 100 | 100 | 100 | 100 | 100 | 57 | 80 | 100 | 100 |

TABLE 1-continued

| Temperature (° C.) | Catalyst A | | Catalyst B | | Catalyst C | | Catalyst D | | Catalyst E | | Catalyst F | |
|---|---|---|---|---|---|---|---|---|---|---|---|---|
| | HC Removal efficiency | CO removal efficiency | HC removal efficiency | CO removal efficiency | HC removal efficiency | CO removal efficiency | HC removal efficiency | CO removal efficiency | HC removal efficiency | CO removal efficiency | HC removal efficiency | CO removal efficiency |
| 380 | 100 | 100 | 100 | 100 | 100 | 100 | 100 | 100 | 80 | 94 | 100 | 100 |
| 430 | 100 | 100 | 100 | 100 | 100 | 100 | 100 | 100 | 100 | 100 | 100 | 100 |

HC and CO can be removed at during lean operation by any of the catalysts from examples 1 to 3 (A, B, C).

Figure 5:
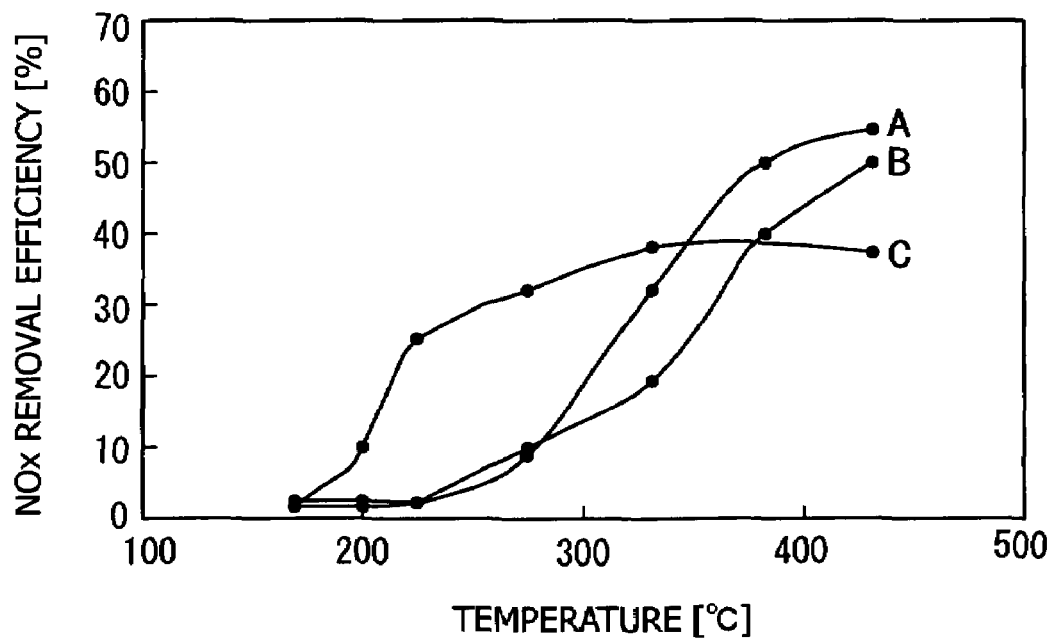
FIG. 5 is a graph showing data of NOx removal efficiency of a catalyst after a sulfur poisoning test in example 4, which is measured by changing temperature.

Also, to investigate the performance regarding sulfur poisoning of the catalysts obtained in examples, SOx poisoning was performed under the following conditions: SV: 30000 h$^{-1}$, SO$_2$ concentration: 1000 ppm, O$_2$ concentration: 5%, H$_2$O concentration: 10%, N$_2$ atmosphere, 350° C., gas flow time: 24 hours As example 4, FIG. 5 shows the measurement result of NOx removal efficiency after sulfur poisoning test of the catalysts (A, B, C) in examples 1, 2 and 3. The test condition is such that the gas flow condition is the same as described above, a rich/lean state is repeated alternately, and the content of NOx in front of and behind the catalyst is measured.

From the result of FIG. 5, for any catalyst, a great decrease in performance is not found after sulfur poisoning test. Therefore, the catalyst containing the compound oxide of general formula (1) in accordance with the present invention has resistance to sulfur poisoning, so that CO, HC and NOx in oxygen-excess exhaust gas containing SOx can be removed with high efficiency by using the catalyst in accordance with the present invention.

Example 5

[Verification of Effect of Transition Metal M in Compound Oxide Catalyst of General Formula (1)]

Figure 6:
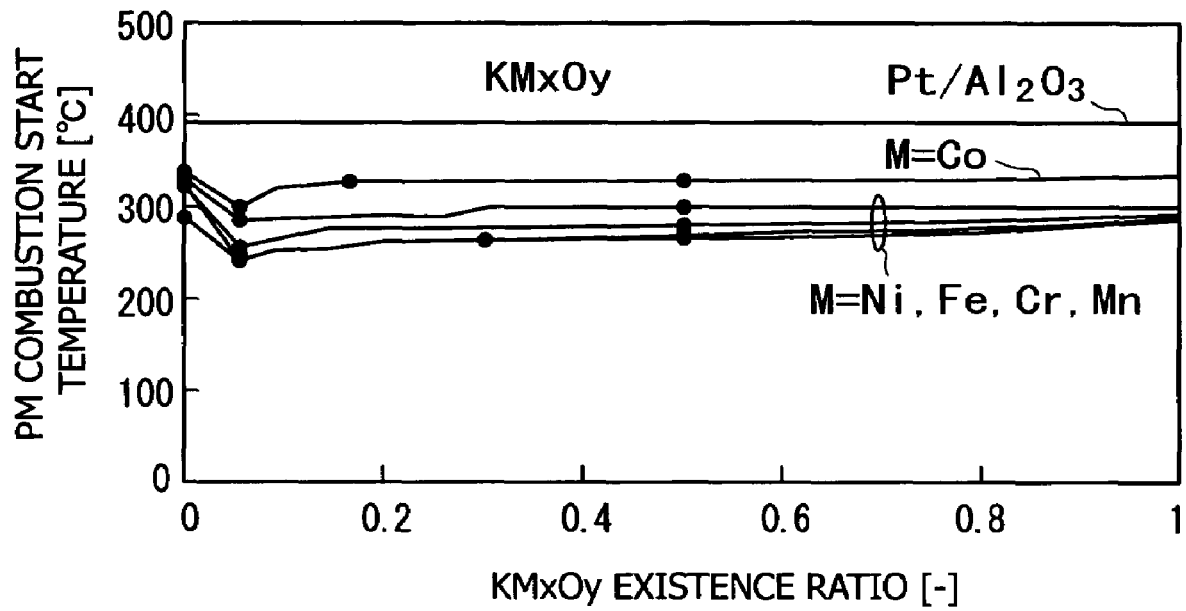
FIG. 6 is a graph of a particulate combustion temperature measured by changing the content of a compound oxide in a catalyst in example 5.
Figure 7:
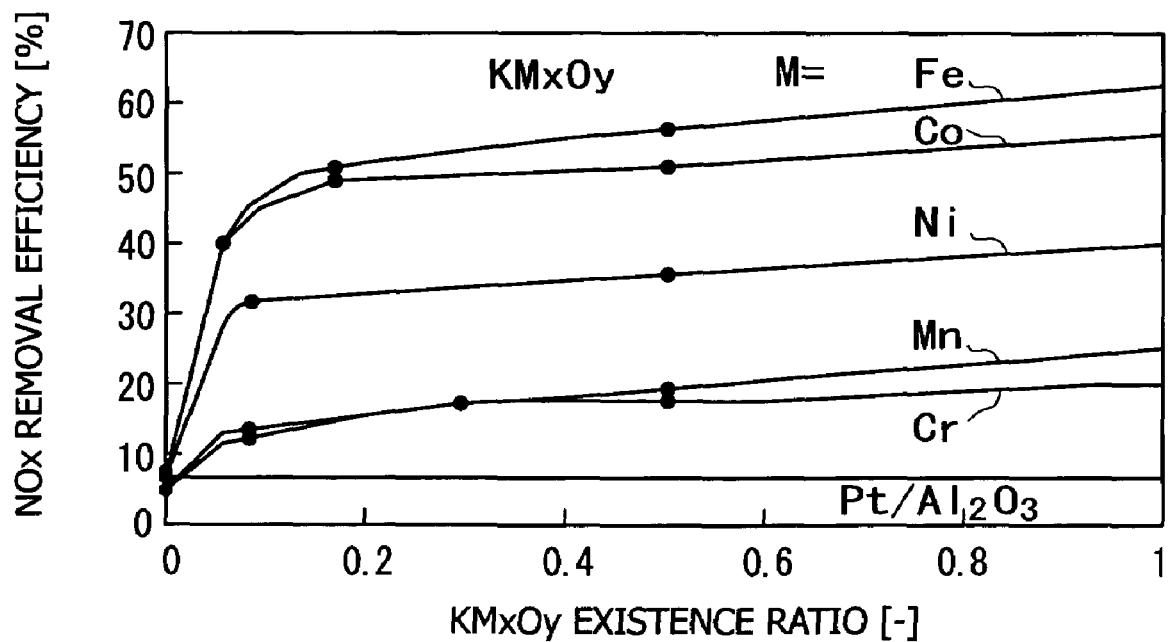
FIG. 7 is a graph of NOx removal efficiency measured by changing the content of a compound oxide in a catalyst in example 5.

K$_2$CO$_3$ and transition metal oxides Cr$_2$O$_3$, Mn$_2$O$_3$, Fe$_2$O$_3$, CoO, NiO were weighed by changing the ratio, being mixed by the ball mill mixing method in the same way as that in example 1, and thereafter were fired. The obtained compound oxides K$_2$CrO$_4$, K$_2$Mn$_4$O$_8$, KFeO$_2$, KCo$_2$O$_4$, KNiO$_2$ were evaluated by the same method as that for the catalysts in examples 1 to 3. As a comparative example, Pt/Al$_2$O$_3$ of 3% by weight was also evaluated. FIG. 6 shows results regarding PM combustion, and FIG. 7 shows results regarding NOx removal efficiency.

It was found that all of the compound oxides of general formula (1) obtained in example 5 have a low PM combustion start temperature and high NOx removal efficiency as compared with the catalyst Pt/Al$_2$O$_3$ of comparative example. As the content of KMxOy increased, the NOx removal efficiency increased though the PM combustion start temperature was unchanged.

The condition of this test was a lean steady condition, activated carbon was mixed so as to be catalyst+5 wt %, and exhaust gas (O$_2$: oxygen concentration: 10%, NOx: 1000 ppm, H$_2$O: 10%, N$_2$ atmosphere) from a fixed floor flow reaction device and a simulated diesel engine was caused to flow at a rate of 0.5 liter per minute. The temperature of catalyst was raised at a rate of 1° C./min, by which the combustion start temperature of particulate was determined based on the yield of CO$_2$. Also, the NOx removal efficiency was determined from the NOx content in front of and behind the catalyst.

Example 6

[Verification of Effect of Alkali Metal or Alkaline Earth Metal A in Compound Oxide Catalyst of General Formula (1)]

Figure 8:
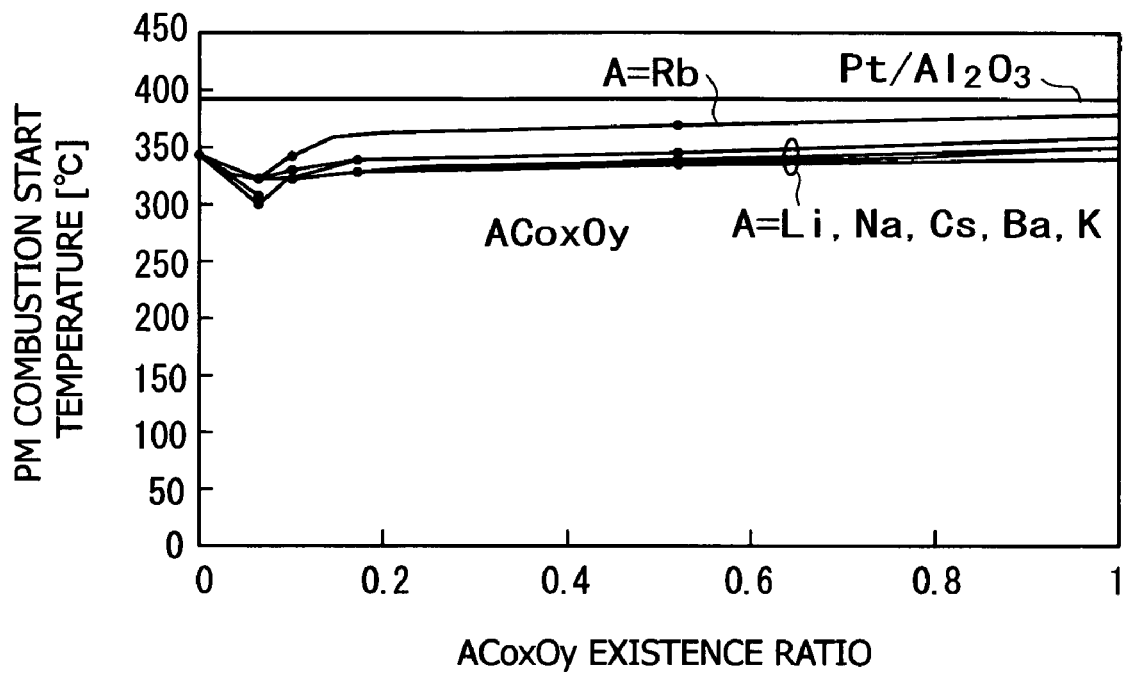
FIG. 8 is a graph of a particulate combustion temperature measured by changing the content of a compound oxide in a catalyst in example 6.
Figure 9:
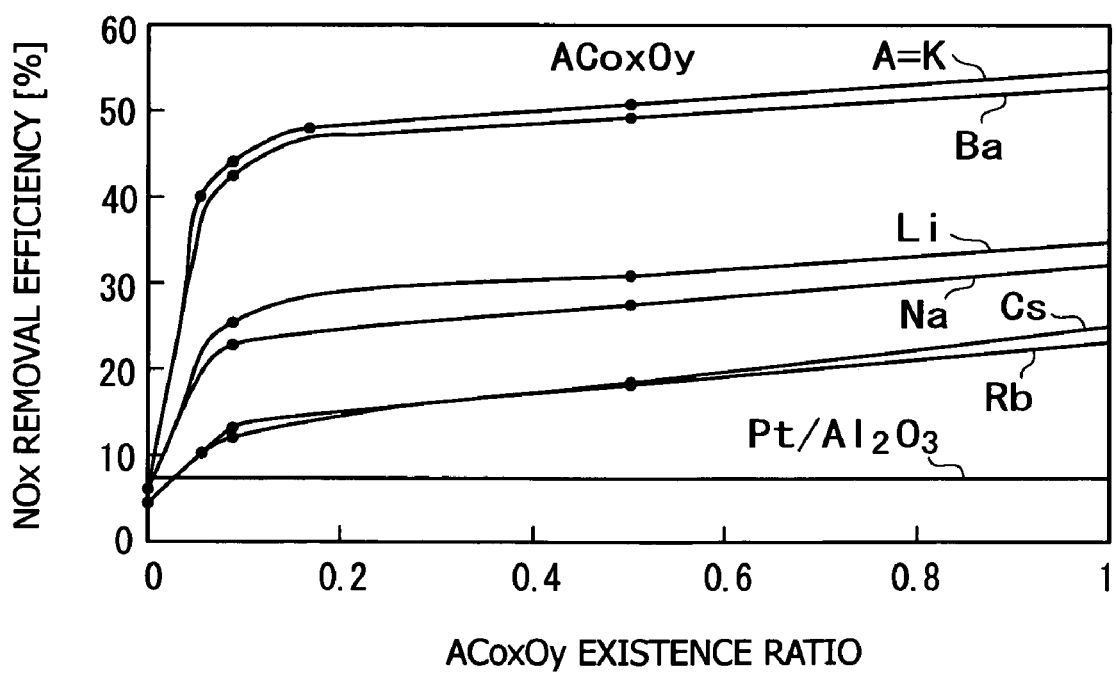
FIG. 9 is a graph of NOx removal efficiency measured by changing the content of a compound oxide in a catalyst in example 6.

Carbonates of alkali metal or alkaline earth metal Li$_2$CO$_3$, Na$_2$CO$_3$, K$_2$CO$_3$, Cs$_2$CO$_3$, Rb$_2$CO$_3$, BaCO$_3$ and a transition metal oxide CoO were weighted by changing the ratio, being mixed by the ball mill mixing method in the same way as that in example 1, and thereafter were fired. The obtained compound oxides LiCoO$_2$, NaCoO$_2$, KCo$_2$O$_4$, CsCoO$_3$, RbCoO$_2$, and Ba$_2$CoO$_4$ were evaluated by the same method as that in example 5. As a comparative example, Pt/Al$_2$O$_3$ of 3% by weight was also evaluated. FIG. 8 shows results regarding PM combustion, and FIG. 9 shows results regarding NOx removal efficiency.

It was found that all of the compound oxides of general formula (1) obtained in example 6 have a low PM combustion start temperature and high NOx removal efficiency as compared with the catalyst Pt/Al$_2$O$_3$ of comparative example. As the content of AMxOy increased, the NOx removal efficiency increased though the PM combustion start temperature was less influenced by the kind and amount of alkali metal or alkaline earth metal.

Example 7

[Case Where Perovskite Compound Oxide of General Formula (2) is Present in Compound Oxide Catalyst of General Formula (1)]

Figure 10:
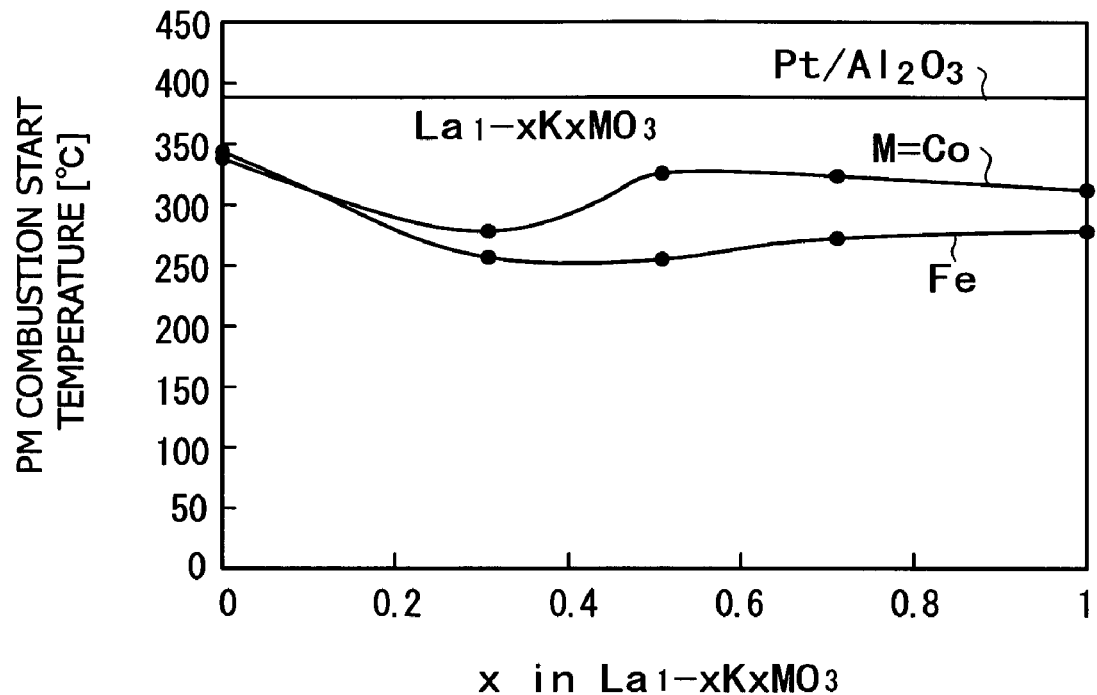
FIG. 10 is a graph of a particulate combustion temperature measured by changing the content of a compound oxide in a catalyst in example 7.
Figure 11:
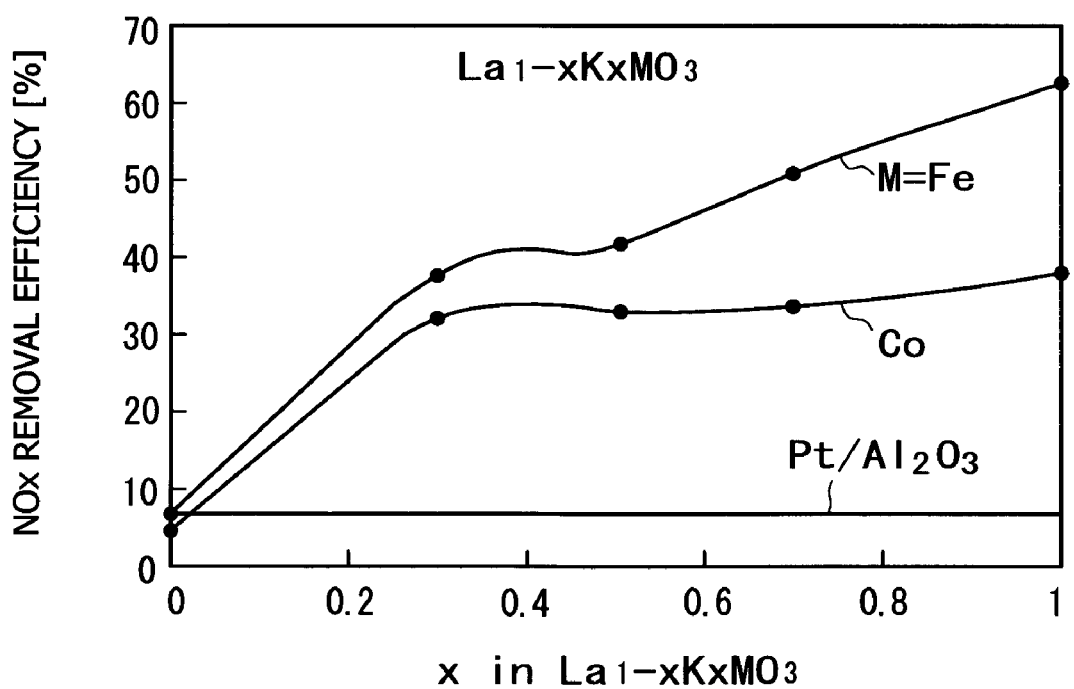
FIG. 11 is a graph of NOx removal efficiency measured by changing the content of a compound oxide in a catalyst in example 7.

A hydroxide La(OH)$_3$ of La as a lanthanoid group element Ln, a carbonate K$_2$CO$_3$ of k as an alkaline metal A, and oxides of Fe and Co were weighed by changing the ratio so as to be La$_{1-\alpha'}$K$_{\alpha'}$MO (in formula, 0<α'<1), being mixed by the ball mill mixing method in the same way as that in example 1, and thereafter were fired. The obtained compound oxide KFeO$_2$ coexists with perovskite compound oxide La$_{1-\alpha'}$K$_{\alpha'}$FeO, and KCo$_2$O$_4$ coexists with La$_{1-\alpha'}$K$_{\alpha'}$CoO. As α' increases, the content of KFeO$_2$ or KCo$_2$O$_4$ increases. The catalysts containing these compound oxides were evaluated by the same method as that in example 5. As a comparative example, Pt/Al$_2$O$_3$ of 3% by weight was also evaluated. FIG. 10 shows results regarding PM combustion, and FIG. 11 shows results regarding NOx removal efficiency.

It was found that both of the catalysts containing the compound oxides obtained in example 7 have a low PM combustion start temperature and high NOx removal efficiency as compared with the catalyst Pt/Al$_2$O$_3$ of comparative example. Thereby, it was clarified that the catalyst has a low PM combustion start temperature and high NOx removal efficiency even in the presence of perovskite compound oxide expressed by general formula (2).

Example 8

[Verification of Effect Due to Addition of Noble Metal to Compound Oxide Catalyst]

An alkali metal carbonate $K_2CO_3$, transition metal oxides $Cr_2O_3$, $Mn_2O_3$, $Fe_2O_3$, CoO, NiO, and noble metal oxides $PtO_2$, $IrO_2$, PdO were weighed so that the ratio of transition metal M to noble metal P was M:P=0.9:0.1 to form $K(M_{0.9}P_{0.1})_xO_y$, and 0.1 of transition metal was replaced with a noble metal, being mixed by the ball mill mixing method in the same way as that in example 1, and thereafter were fired. The obtained compound oxides $K(M_{0.9}Pt_{0.1})_xO_y$, $K(M_{0.9}Ir_{0.1})_xO_y$, $K(M_{0.9}Pd_{0.1})_xO_y$ (M is Cr, Mn, Fe, Co or Ni) were evaluated by the same method as that in example 5. For comparison, a compound oxide to which no noble metal oxide was added was also evaluated.

Next, an alkali metal carbonate $K_2CO_3$, transition metal oxides $Fe_2O_3$, CoO, a noble metal oxide $PtO_2$, and $La(OH)_3$ were weighed so as to be $La_{0.7}K_{0.3}MO_{0.95}P_{0.05}O_3+K(M_{0.95}P_{0.05})_xO_y$, being mixed by the ball mill mixing method in the same way as that in example 1, and thereafter were fired. The obtained coexistence system of perovskite compound oxide $La_{0.7}K_{0.3}M_{0.95}Pt_{0.05}O$ and compound oxide $KM_{0.95}Pt_{0.05}O$ was evaluated by the same method as that in example 5. For comparison, a compound oxide to which no noble metal oxide was added was also evaluated.

Figure 12:
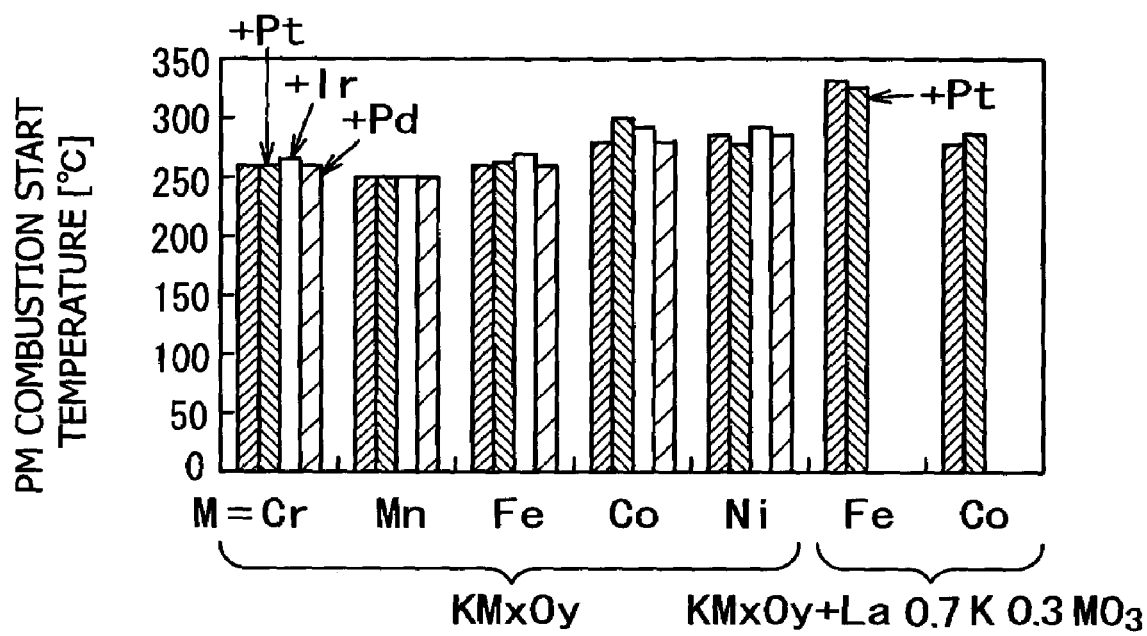
FIG. 12 is a graph of a particulate combustion temperature measured by changing the kind of transition metal M in a catalyst in example 8.
Figure 13:
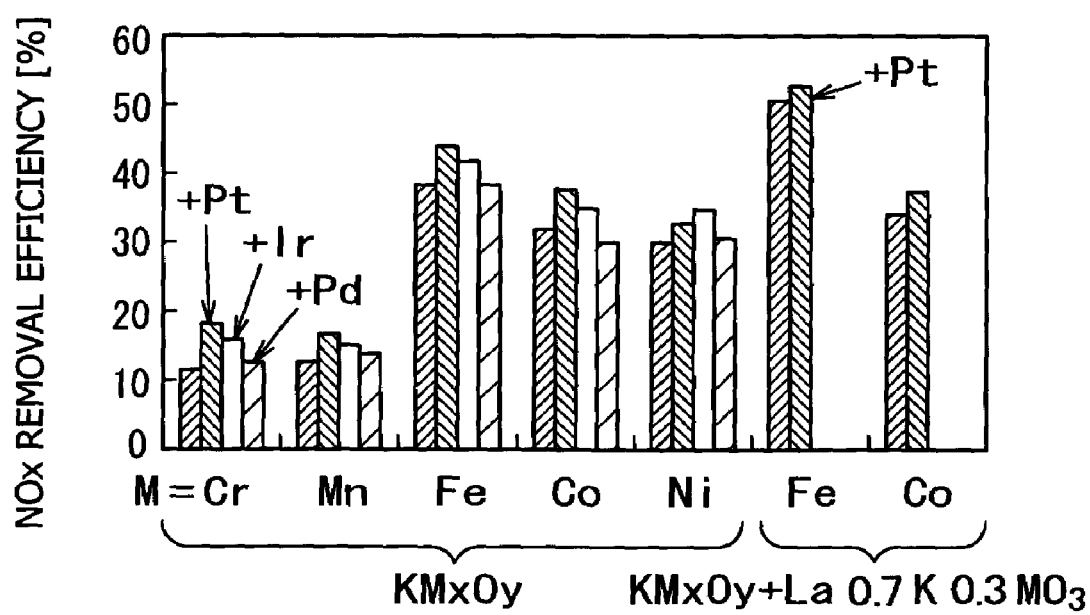
FIG. 13 is a graph of NOx removal efficiency measured by changing the kind of transition metal M in a catalyst in example 8.

FIG. 12 shows results regarding PM combustion, and FIG. 13 shows results regarding NOx removal efficiency.

It was found that all of the compound oxide catalysts containing noble metals obtained in example 8 have a low PM combustion start temperature and high NOx removal efficiency. Also, it was found that although the PM combustion start temperature is less influenced by the noble metal component, Pt and Ir improve the NOx removal efficiency.

Example 9

[Verification of Sulfur Resistance Improving Effect Due to Mixing of Carbonate of Alkali or Alkaline Earth Metal with Compound Oxide Catalyst]

First, an alkali metal carbonate $K_2CO_3$ and transition metal oxides $Cr_2O_3$, $Mn_2O_3$, $Fe_2O_3$, CoO, NiO were weighed so that $K_2CO_3$ was in excess (+10 mol %), being mixed by the ball mill mixing method in the same way as that in example 1, and thereafter were fired. The obtained compound oxides $K_2CrO_4$, $K_2Mn_4O_8$, $KFeO_2$, $KCo_2O_4$, $KNiO_2$ were evaluated by the same method as that of example 5.

Next, an alkali metal carbonate $K_2CO_3$ and transition metal oxides $Fe_2O_3$, CoO, were weighed so as to be $La_{0.7}K_{0.3}MO_3+KM_xO_y$ and so that $K_2CO_3$ was in excess (+10 mol %), being mixed by the ball mill mixing method in the same way as that in example 1, and thereafter were fired. The obtained coexistence system of perovskite compound oxide and compound oxide $KFeO_2$ or $KCo_2O_4$ was evaluated by the same method as that in example 5. For comparison, for each of them, a compound oxide catalyst in the case where a transition metal oxide and $K_2CO_3$ were mixed so as not to be in excess stoichiometrically was also evaluated.

Figure 14:
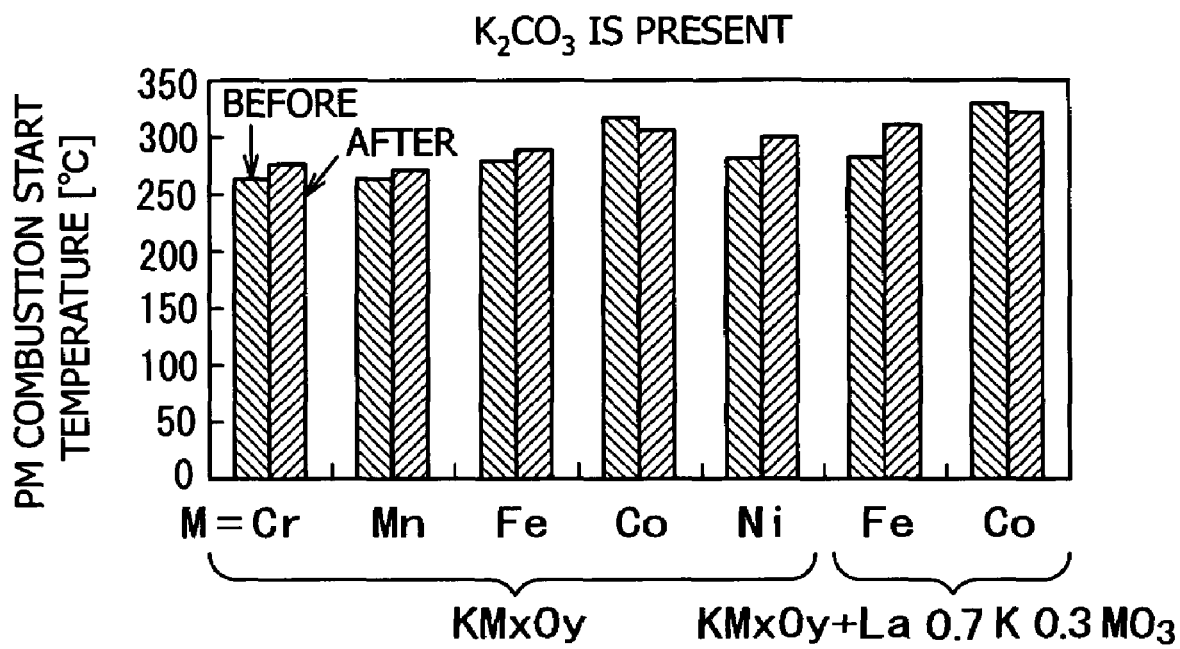
FIG. 14 is a graph of a particulate combustion temperature measured by changing the kind of transition metal M in a catalyst in example 9, FIG. 14(a) showing data in the presence of a carbonate, and FIG. 14(b) showing data in the absence of a carbonate.
Figure 14:
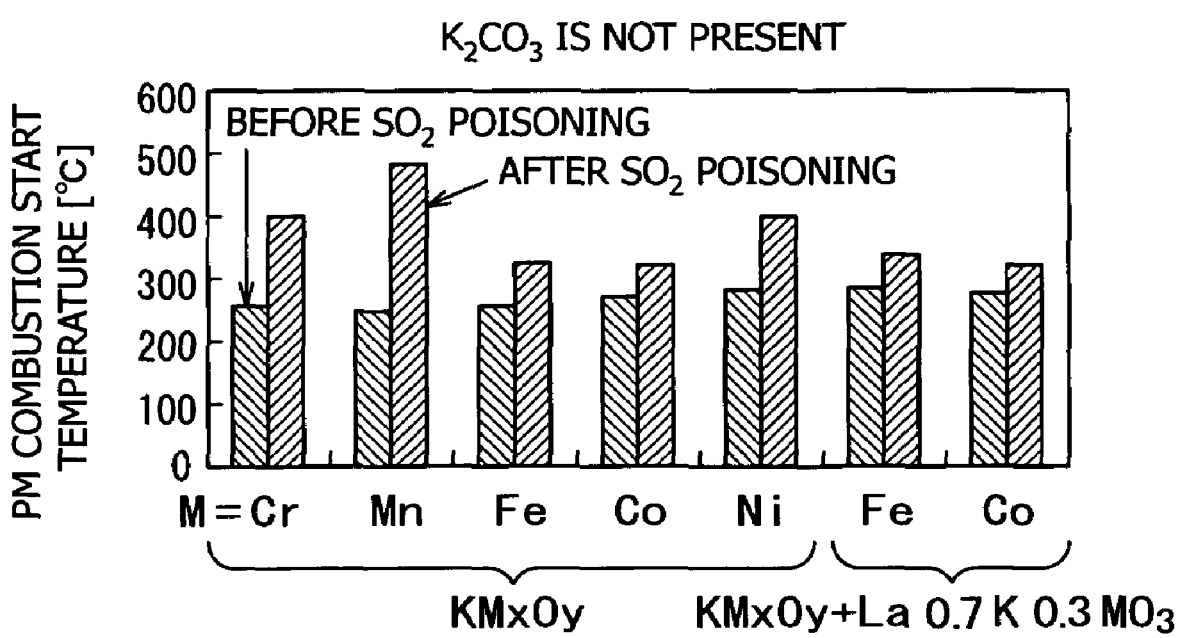
Figure 15:
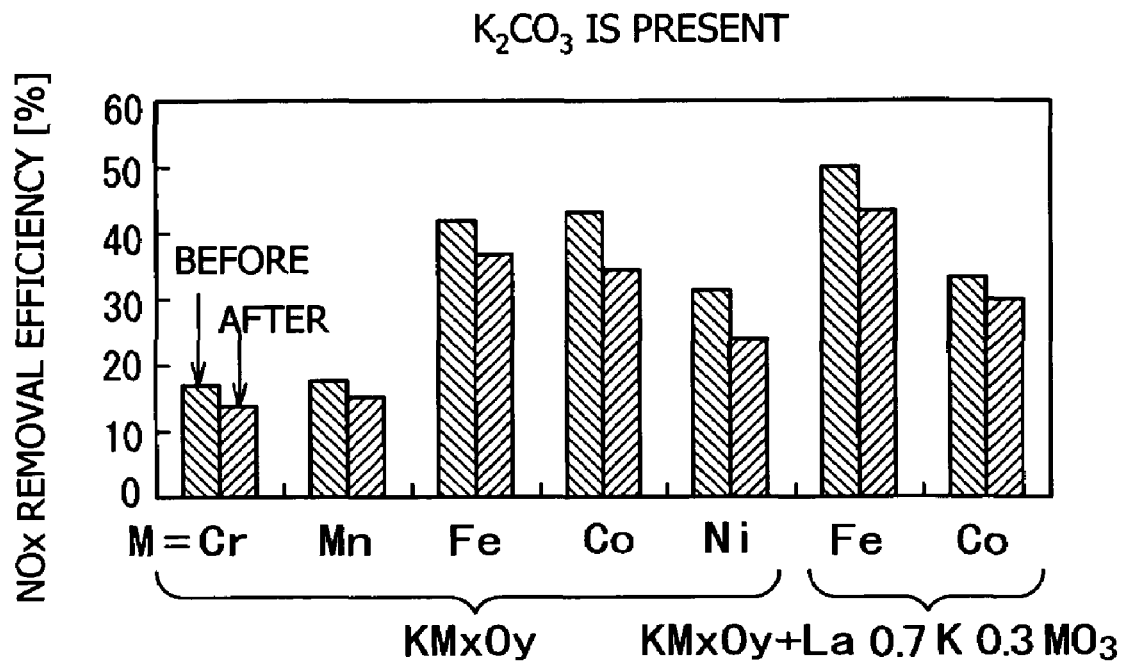
FIG. 15 is a graph of NOx removal efficiency measured by changing the kind of transition metal M in a catalyst in example 9, FIG. 15(a) showing data in the presence of a carbonate, and FIG. 15(b) showing data in the absence of a carbonate.
Figure 15:
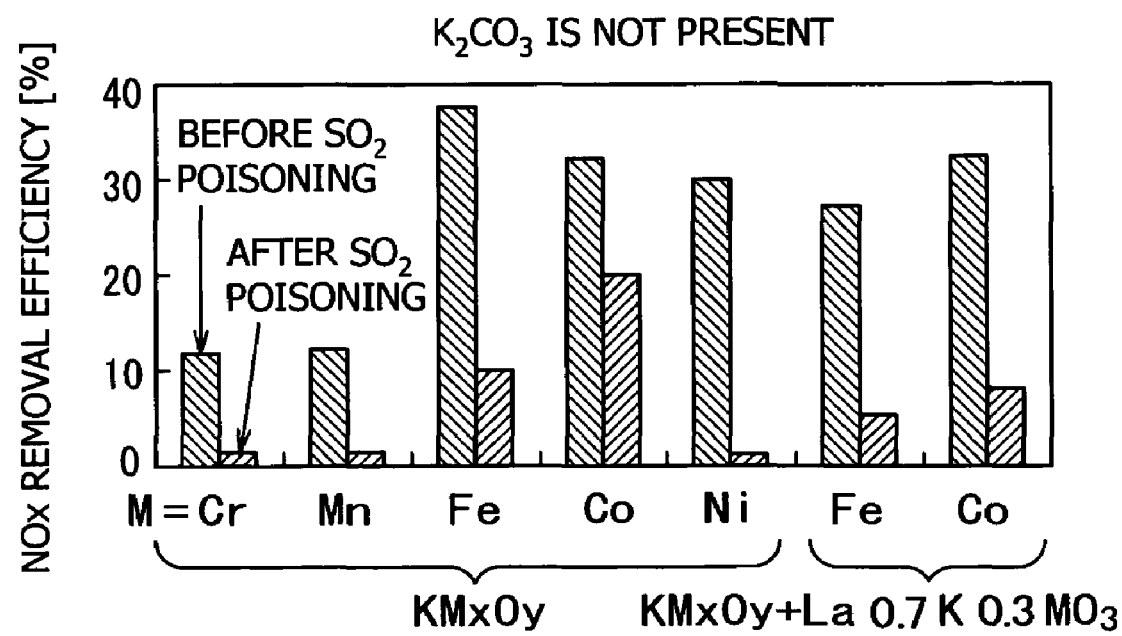

FIG. 14 shows results regarding PM combustion, and FIG. 15 shows results regarding NOx removal efficiency.

In a system (b) in which $K_2CO_3$ was not present, after $SO_2$ poisoning, in systems that did not contain Co and Fe, the PM combustion start temperature of all catalyst systems rose by about 100° C. or more, and the NOx removal efficiency decreased. On the other hand, it was found that in a system (a) in which $K_2CO_3$ was present, even after $SO_2$ poisoning, in systems that contained any kind of transition metal, the PM combustion start temperature was kept low, and the NOx removal efficiency could be kept at a high level. NOx removal efficiency of 10% or higher at the minimum was kept, and for the Fe or Co base compound oxides, NOx removal efficiency of 30% or higher was kept.

From this fact, it was found that the sulfur poisoning resistance of catalyst is improved by $K_2CO_3$ that is present in the compound oxide. The reference for evaluation was that a difference in combustion temperature and a difference in NOx removal efficiency are not higher than fixed values (100° C. and 20%, respectively) before and after poisoning when a catalyst is subject to poisoning of 10% $H_2O$-200ppm$SO_2$-10% $O_2$-$N_2$ for 100 hours.

As described above in detail, if the exhaust gas treatment catalyst in accordance with the present invention is used, particulates in exhaust gas can be removed by burning continuously at a relatively low temperature, and at the same time, nitrogen oxides NOx can be removed effectively. Also, the compound oxide catalyst in the exhaust gas treatment catalyst in accordance with the present invention has excellent heat resistance and resistance to sulfur poisoning, so that high exhaust gas treatment performance can be maintained for a long period of time. Further, the catalyst in accordance with the present invention is low in cost, and can remove carbon monoxide and hydrocarbon with high efficiency in addition to nitrogen oxides in engine exhaust gas containing excess oxygen.

Therefore, the exhaust gas treatment catalyst in accordance with the present invention is used suitably especially for exhaust gas treatment of oxidizing atmosphere as found in diesel engine exhaust gas etc., and is extremely high in terms of its industrial significance.

The invention claimed is:

1. An exhaust gas treatment catalyst characterized by containing a compound oxide expressed by the following general formula (1):

$$AM_xO_y \qquad (1)$$

(wherein A represents an alkali metal or alkaline earth metal, M represents Cr, Mn, Fe, Co or Ni, O represents oxygen, and $0<x\leq 4$ and $0<y\leq 8$); and further containing a perovskite compound oxide expressed by the following general formula (2) in addition to said compound oxide of general formula (1):

$$Ln_{1-\alpha}A_\alpha MO3 \qquad (2)$$

(wherein Ln represents a lanthanide group element, A represents an alkali metal, M represents Cr, Mn, Fe, Co or Ni, O represents oxygen, and $0<\alpha\leq 0.5$), wherein a noble metal is contained in some of said compound oxide of general formula (1).

2. The exhaust gas treatment catalyst according to claim 1, characterized in that in said general formula (1), M is Co or Fe.

3. The exhaust gas treatment catalyst according to claim 1, characterized in that in said general formula (1), A is at least one kind selected from a group consisting of Li, Na, K, Cs, Rb and Ba.

4. The exhaust gas treatment catalyst according to claim 1, characterized in that in said general formula (2), Ln is La.

5. The exhaust gas treatment catalyst according to claim 1, characterized in that said noble metal is at least one kind selected from a group consisting of Au, Ag, Pt, Pd, Ir, Rh and Ru.

6. The exhaust gas treatment catalyst according to claim 1, characterized by further containing a carbonate of an alkali metal or alkaline earth metal.

7. The exhaust gas treatment catalyst according to claim 6, characterized in that said carbonate is at least one kind selected from a group consisting of $Li_2CO_3$, $Na_2CO_3$, $K_2CO_3$, $Cs_2CO_3$, $Rb_2CO_3$ and $Ba_2CO_3$.

8. The exhaust gas treatment catalyst according to any one of claims 1-3, 4, 5, 6 or 7, characterized in that said catalyst is carried on a carrier, and said carrier is at least one kind selected from a group consisting of alumina, zirconia, silica alumina, silica, and zeolite.

9. An exhaust gas treatment method for treating exhaust gas by using the exhaust gas treatment catalyst described in any one of claims 1-3, 4, 5, 6, or 7, characterized in that by fine powder of said exhaust gas treatment catalyst carried on a filter-form carrier, particulates in exhaust gas are removed by burning, and at the same time, nitrogen oxides are removed.

* * * * *